(12) United States Patent
Wallace

(10) Patent No.: US 11,391,487 B2
(45) Date of Patent: Jul. 19, 2022

(54) AIR TO AIR CROSS FLOW HEAT AND MOISTURE EXCHANGER

(71) Applicant: Bradford D Wallace, Lexington, KY (US)

(72) Inventor: Bradford D Wallace, Lexington, KY (US)

( * ) Notice: Subject to any disclaimer, the term of this patent is extended or adjusted under 35 U.S.C. 154(b) by 50 days.

(21) Appl. No.: 17/023,500

(22) Filed: Sep. 17, 2020

(65) Prior Publication Data

US 2022/0082295 A1    Mar. 17, 2022

(51) Int. Cl.
| | |
|---|---|
| *F28D 15/00* | (2006.01) |
| *F24F 13/30* | (2006.01) |
| *F24F 6/04* | (2006.01) |
| *F24F 7/04* | (2006.01) |
| *F28F 1/14* | (2006.01) |
| *F28D 7/10* | (2006.01) |

(52) U.S. Cl.
CPC .............. *F24F 13/30* (2013.01); *F24F 6/04* (2013.01); *F24F 7/04* (2013.01); *F28D 7/106* (2013.01); *F28F 1/14* (2013.01)

(58) Field of Classification Search
CPC ..... F24F 13/30; F24F 6/04; F24F 7/04; F28D 7/106; F28F 1/14
USPC .................................................... 165/104.13
See application file for complete search history.

(56) References Cited

U.S. PATENT DOCUMENTS

| | | | |
|---|---|---|---|
| 2,233,189 A * | 2/1941 | Altenkirch ........... | B01D 53/261 62/94 |
| 4,377,400 A | 3/1983 | Okamoto et al. | |
| 4,484,938 A | 11/1984 | Okamoto et al. | |
| 4,512,393 A | 4/1985 | Maendel | |
| 4,616,696 A | 10/1986 | Brundrett et al. | |
| 4,653,574 A | 3/1987 | Quinlisk et al. | |
| 4,653,575 A | 3/1987 | Courchesne | |
| 4,794,980 A | 1/1989 | Raisanen | |
| 4,872,503 A | 10/1989 | Marriner | |
| 4,993,484 A | 2/1991 | Neuzil | |
| 5,385,299 A | 1/1995 | Zawada | |
| 5,632,334 A | 5/1997 | Grinbergs et al. | |
| 6,032,730 A | 3/2000 | Akita et al. | |
| 6,248,153 B1 | 6/2001 | Braun et al. | |
| 6,776,704 B2 | 8/2004 | Goncalves et al. | |
| 6,983,788 B2 | 1/2006 | Haglid | |

(Continued)

*Primary Examiner* — Davis D Hwu

(74) *Attorney, Agent, or Firm* — George Pappas; Barrett McNagny LLP

(57) ABSTRACT

A house/building fresh air to air cross flow heat exchanger includes an inner elongate conduit disposed longitudinally within an outer elongate housing thereby defining a first air passageway through the inner conduit and a second air passageway between the inner conduit and the housing. A portion of the inner conduit is constructed with a sorption paper wall/assembly between the passageways. The sorption paper assembly is cylindrical shaped and includes a plurality of longitudinally extending folded pleats thereby increasing the surface area between the exhaust and incoming fresh air passageways. A cylindrical air permeable screen extends longitudinally through and radially supports the sorption paper wall/assembly. The passageways can be connected to a furnace duct using air scoops to thereby forcibly direct air through the passageways. Alternatively, a fan assembly is aligned with the passageways for forcibly directing air therethrough.

23 Claims, 14 Drawing Sheets

(56) References Cited

U.S. PATENT DOCUMENTS

| | | |
|---|---|---|
| 7,188,665 B2 | 3/2007 | Arai et al. |
| 7,188,666 B2 | 3/2007 | Lee et al. |
| 7,624,788 B2 | 12/2009 | Brown et al. |
| 7,824,766 B2 | 11/2010 | Eplee et al. |
| 9,103,560 B2 | 8/2015 | Dempsey et al. |
| 9,803,884 B2 | 10/2017 | Jung |
| 2003/0106680 A1 | 6/2003 | Serpico et al. |
| 2008/0139104 A1 | 6/2008 | Lemke |

* cited by examiner

AIR TO AIR CROSS FLOW HEAT AND MOISTURE EXCHANGER

BACKGROUND OF THE INVENTION

1. Field of the Invention

The present invention relates to the field of air to air heat exchangers for providing fresh air to houses and buildings. More particularly, the present invention relates to the field of fresh air to air cross flow heat exchangers for conveying both heat and water moisture between the air being discharged from the building and the fresh air being transported/delivered into the building.

2. Background

Air to air cross flow heat exchangers are known and used for providing fresh air into houses and buildings and, simultaneously, conducting/conveying heat from the air being discharged from the house/building to the incoming fresh air being delivered into the house/building, and vice versa, for thereby minimizing heat losses and gains. Such air to air cross flow heat exchangers are shown and described, for example, in Lemke, US 2008/0139104; Zawada, U.S. Pat. No. 5,385,299; and Raisanen, U.S. Pat. No. 4,794,980.

Although the prior known house and building air to air cross flow heat exchangers function adequately to transfer heat from the discharged air to the incoming fresh air, and vice versa, they tend to be fairly bulky/large and costly to manufacture. Additionally, during the winter when the outdoor humidity decreases, the use of the prior known heat exchangers tend to remove water moisture from within the house/building along with the discharged air, and to introduce incoming fresh air which is undesirably dry. Similarly, during the summer when the outdoor humidity increases, the use of the prior known heat exchangers tend to remove the dryer/less humid air from within the house/building along with the discharged air, and to introduce incoming fresh air which is undesirably humid.

Accordingly, a need exists for an improved air to air cross flow heat exchanger which is not large/bulky, is relatively inexpensive to manufacture, and which is capable of conveying both heat and water moisture between the air being discharged from the house/building and the fresh air being transported into the house/building so as to not only minimize heat gains/losses but, also, to minimizing undesirable gains/losses of humidity/water moisture.

SUMMARY OF THE INVENTION

The present invention overcomes the disadvantageous of prior air to air cross flow heat exchangers by providing a heat exchanger which is not large/bulky, is relatively inexpensive to manufacture, and which is capable of conveying both heat and water moisture between the air being discharged from the house/building and the fresh air being transported into the house/building.

In one form thereof, the present invention is directed to an air to air cross flow heat and water moisture exchanger for transporting air through a wall between interior and exterior spaces. The exchanger includes an outer elongate housing. An inner elongate conduit is disposed longitudinally within the outer elongate housing. The inner elongate conduit defines a first passageway therethrough extending between the interior and exterior spaces. The outer elongate housing and the inner elongate conduit together define a second passageway therebetween extending between the interior and exterior spaces. A portion of the inner elongate conduit comprises a sorption paper wall between the first and second passageways, wherein the sorption paper wall conducts heat and water moisture therethrough and is generally impervious to air, whereby heat and water moisture is exchanged through the sorption paper wall between the air traveling through the first passageway and the air traveling through the second passageway.

Preferably, the sorption paper wall is pleat shaped. An air permeable screen can be provided supporting the pleat shaped sorption paper wall. More preferably, the pleat shaped sorption paper wall extends between peaks and valleys and wherein the valleys are disposed adjacent the air permeable screen and the peaks are disposed adjacent the outer elongate housing.

The interior space of the air to air cross flow heat and water moisture exchanger can include an air duct with directional air flow therethrough. An exhaust air scoop can be provided extending into the air duct having an opening facing opposite the direction of the duct air flow and communicating with one of the first or second passageways. An intake air scoop or a venturi shaped tube can also be provided extending into the air duct having an opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop or venturi shaped tube to the air duct interior space.

The air to air cross flow heat and water moisture exchanger can include a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction. The central blades can be aligned with the first passageway extending through the inner pipe. The circumscribing blades can be aligned with the second passageway between the outer elongate housing pipe and the inner elongate pipe.

In another form thereof, the present invention is directed to an air to air cross flow heat and water moisture exchanger for transporting air through a wall between interior and exterior spaces. The exchanger includes an outer elongate housing. An inner elongate conduit is disposed longitudinally within the outer elongate housing. The inner elongate conduit defines a first passageway therethrough extending between the interior and exterior spaces. The outer elongate housing and the inner elongate conduit together define a second passageway therebetween extending between the interior and exterior spaces. A portion of the inner elongate conduit between interior and exterior ends thereof comprises a cylindrical sorption paper wall between the first and second passageways, wherein the sorption paper wall conducts heat and water moisture therethrough and is generally impervious to air, whereby heat and water moisture is exchanged through the sorption paper wall between the air traveling through the first passageway and the air traveling through the second passageway.

Preferably, a cylindrical air permeable screen secured to and extends between the inner elongate conduit interior and exterior ends and supports the cylindrical sorption paper wall. More preferably, the cylindrical sorption paper wall is pleat shaped and wherein the pleats extend longitudinally along the cylindrical air permeable screen. The pleat shaped sorption paper wall extends between longitudinally extending peaks and valleys and wherein the valleys are disposed adjacent the cylindrical air permeable screen and the peaks are disposed adjacent the outer elongate housing. Star shaped air stop members can be provided at each of the inner elongate conduit interior and exterior ends, wherein the star shaped air stop members extend between an exterior surface of the inner elongate conduit and the longitudinal ends of the pleat shaped sorption paper, whereby the longitudinal ends of the pleat shaped sorption paper are hermetically sealed for preventing air flow thereat between the first and second passageways.

The interior space of the air to air cross flow heat and water moisture exchanger can include an air duct with directional air flow therethrough. An exhaust air scoop can be provided extending into the air duct having an opening facing opposite the direction of the duct air flow and communicating with one of the first or second passageways. An intake air scoop or a venturi shaped tube can also be provided extending into the air duct having an opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop or the venturi shaped tube to the air duct interior space.

The air to air cross flow heat and water moisture exchanger can include a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction. The central blades can be aligned with the first passageway extending through the inner pipe. The circumscribing blades can be aligned with the second passageway between the outer elongate housing pipe and the inner elongate pipe.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
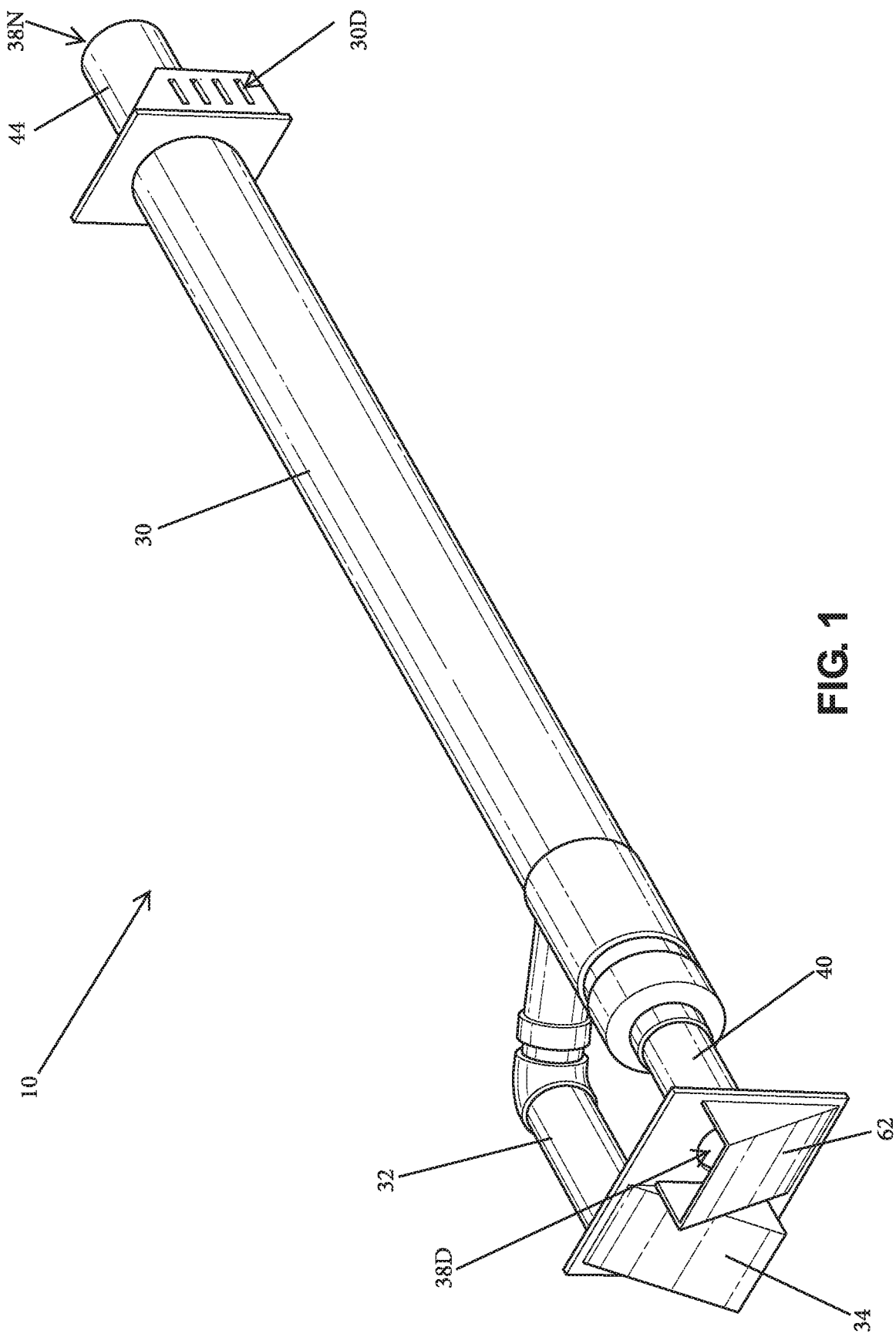
FIG. 1 is a perspective view of an air to air cross flow heat and moisture exchanger constructed in accordance with the principles of the present invention.
Figure 2:
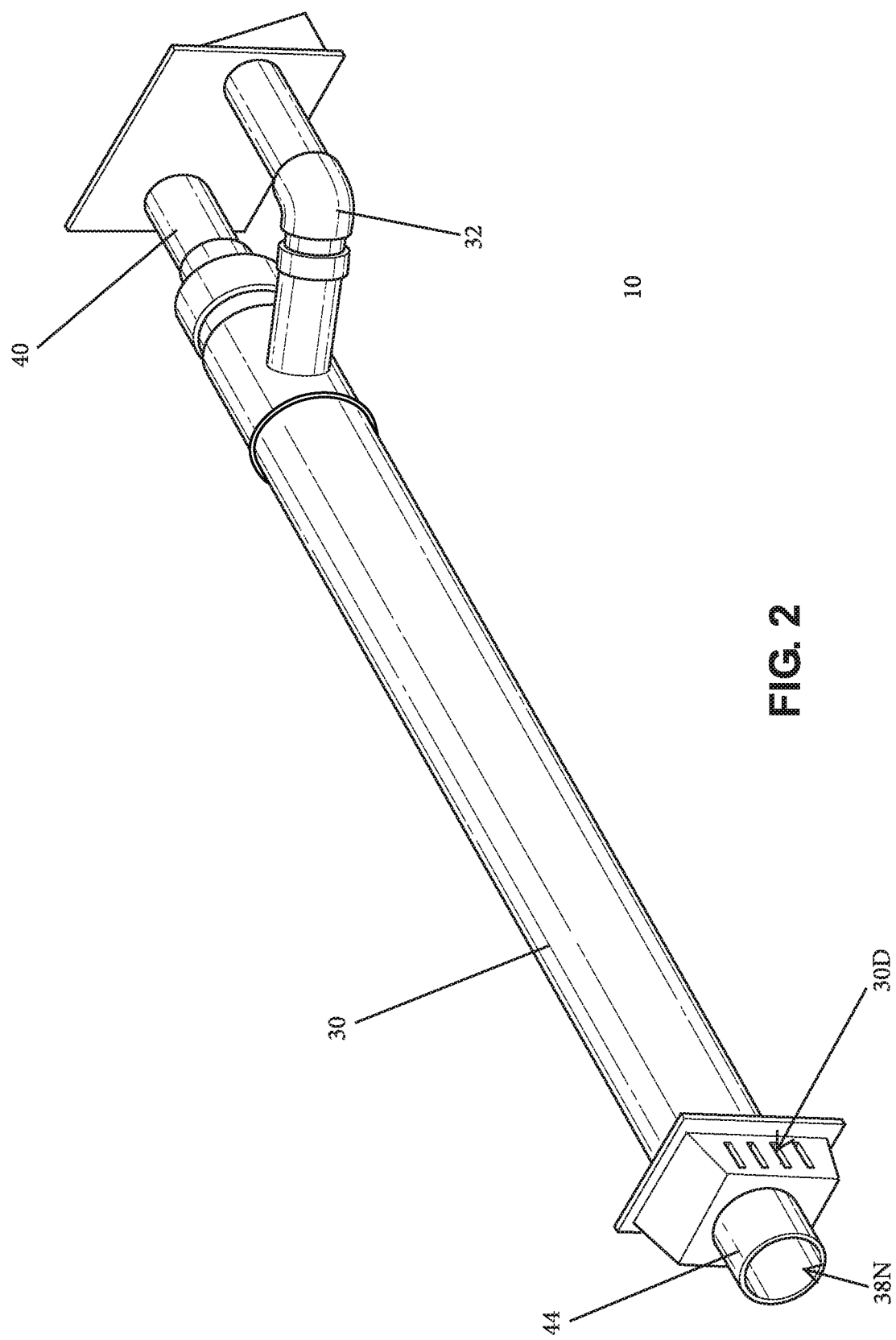
FIG. 2 is another perspective view of the air to air cross flow heat and moisture exchanger shown in FIG. 1.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

An air to air cross flow heat and moisture exchanger constructed in accordance with the principles of the present invention is shown in the drawings and generally designated by the numeral 10. As more fully described hereinbelow, exchanger 10 functions to transport air through a wall 12, such as a building or house wall, between an interior space 14 and an exterior/outdoor space 16. The building wall 12 can, for example, comprise interior sheathing/drywall 18, insulation 20, exterior sheathing 22 and an exterior façade such as brick 24. The interior space 14 can, for example, be an open room or, as depicted in FIGS. 3, 4, 5 and 6, a furnace duct 26 with air flowing therethrough in the direction indicated by arrows 28. The exchanger 10, as more fully described hereinbelow, functions to transport fresh air from the exterior space 16 into the interior space 14 and to transport/expel air from the interior space 14 to the exterior space 16 while, simultaneously, conducting/conveying both heat and water moisture from the air being expelled to the exterior space 16 to the fresh air being reintroduced into the interior space 14, or vice versa.

The exchanger 10 comprises an outer elongate cylindrical housing/pipe 30 preferably made of polyvinyl chloride (PVC) plastic or other suitable material. At its exterior terminal end 30E, which is disposed in the exterior space 16, the outer housing/pipe 30 includes exterior discharge openings 30D. At its interior terminal end 30I, which is disposed in the interior space 14, the outer housing/pipe 30 includes an interior exhaust opening 30N. The interior exhaust opening 30N can be fluidly connected via an interior space exhaust pipe 32 to the duct 26. An interior space air exhaust scoop 34 can be provided at the terminal end of the exhaust pipe 32, within the duct 26. The exhaust scoop 34 has an opening 34O facing opposite the air flow direction 28 whereby air flowing through the duct 26 in the direction of arrows 28 can be captured and forced, as depicted by solid line arrows 36, through the exhaust pipe 32 and outer elongate housing/pipe 30 and then discharged through the discharge openings 30D.

An inner elongate conduit 38 is longitudinally disposed and extends through the outer elongate cylindrical housing/pipe 30. At its exterior terminal end 38E, which is disposed in the exterior space 16, the conduit 38 includes an exterior fresh air intake opening 38N. At its interior terminal end 38I, which is disposed in the interior space 14, the conduit 38 includes an interior fresh air discharge opening 38D.

The inner elongate conduit 38 comprises an interior fresh air pipe 40 preferably made of PVC plastic and extending longitudinally into the outer housing/pipe 30 at the outer housing/pipe interior end 30I. Interior fresh air pipe 40 extends between the inner conduit interior terminal end 38I and an interior end 42. Similarly, an exterior fresh air pipe 44 preferably made of PVC plastic extends longitudinally into the outer housing/pipe 30 at the outer housing/pipe exterior end 30E. Exterior fresh air pipe 44 extends between the inner conduit exterior terminal end 38E and an exterior end 46.

A cylindrical air permeable screen 48 made of plastic, metal or other suitable materials extends between the interior end 42 of the interior fresh air pipe 40 and the exterior end 46 of the exterior fresh air pipe 44. The cylindrical screen 48 can be secured to the interior and exterior pipe ends 42, 46 such as by having an inner diameter to snugly receive and fit over the outer diameter of the interior and exterior pipe ends 42, 46. Alternatively, the cylindrical screen 48 can be a PVC pipe similar to the interior and exterior fresh air pipes 40, 44 with a plurality of holes extending through the wall thereof.

An interior star-shaped air stop member 50 made of plastic, metal or other suitable materials surrounds and is hermetically secured and sealed to the exterior surface of the interior fresh air pipe interior end 42. Preferably, air stop member 50 is made of PVC plastic and includes a central cylindrical opening/hole 50H slightly larger than and adapted to receive the interior fresh air pipe 40 and to be secured thereto such as with an adhesive or by welding. Interior air stop member 50 includes a radial undulating surface defined by peaks 50P, valleys 50V and supporting shoulders 50S therebetween, thereby creating a "star-shape" as viewed from a longitudinal side thereof.

Similarly, an exterior star-shaped air stop member 52 made of plastic, metal or other suitable materials surrounds and is hermetically secured and sealed to the exterior surface of the exterior fresh air pipe exterior end 46. Preferably, air stop member 52 is made of PVC plastic and includes a central cylindrical opening/hole 50H slightly larger than and adapted to receive the exterior fresh air pipe 44 and to be secured thereto such as with an adhesive or by welding. Exterior air stop member 52 includes a radial undulating surface defined by peaks 52P, valleys 52V and supporting shoulders 52S therebetween, thereby creating a "star-shape" as viewed from a longitudinal side thereof.

A generally cylindrically shaped sorption paper wall/assembly 54 surrounds the cylindrical air permeable screen 48 and extends between the interior air stop member 50 and the exterior air stop member 52. Preferably, the cylindrically shaped sorption paper wall/assembly 54 is pleat shaped. That is, the sorption paper is folded forming longitudinally extending peaks 54P, valleys 54V and flat walls 54W therebetween thereby forming longitudinally extending pleats 56 surrounding the cylindrical air permeable screen 48 and together forming a cylinder.

As should now be appreciated, the sorption paper wall/assembly 54 is also "star-shaped" as viewed from its longitudinal end thereof. The interior terminal end 54I of the sorption paper wall/assembly 54 includes the same number of radial peaks and valleys and is slightly radially larger than the interior star-shaped air stop member 50 whereby the interior terminal ends of the sorption paper flat walls 54W extend over and are secured and hermetically sealed to corresponding respective supporting shoulders 50S of the interior star-shaped air stop member 50. Similarly, the exterior terminal end 54E of the sorption paper wall/assembly 54 includes the same number of radial peaks and valleys and is slightly radially larger than the exterior star-shaped air stop member 52 whereby the exterior terminal ends of the sorption paper flat walls 54W extend over and are secured and hermetically sealed to corresponding respective supporting shoulders 52S of the exterior star-shaped air stop member 52.

Figure 10:
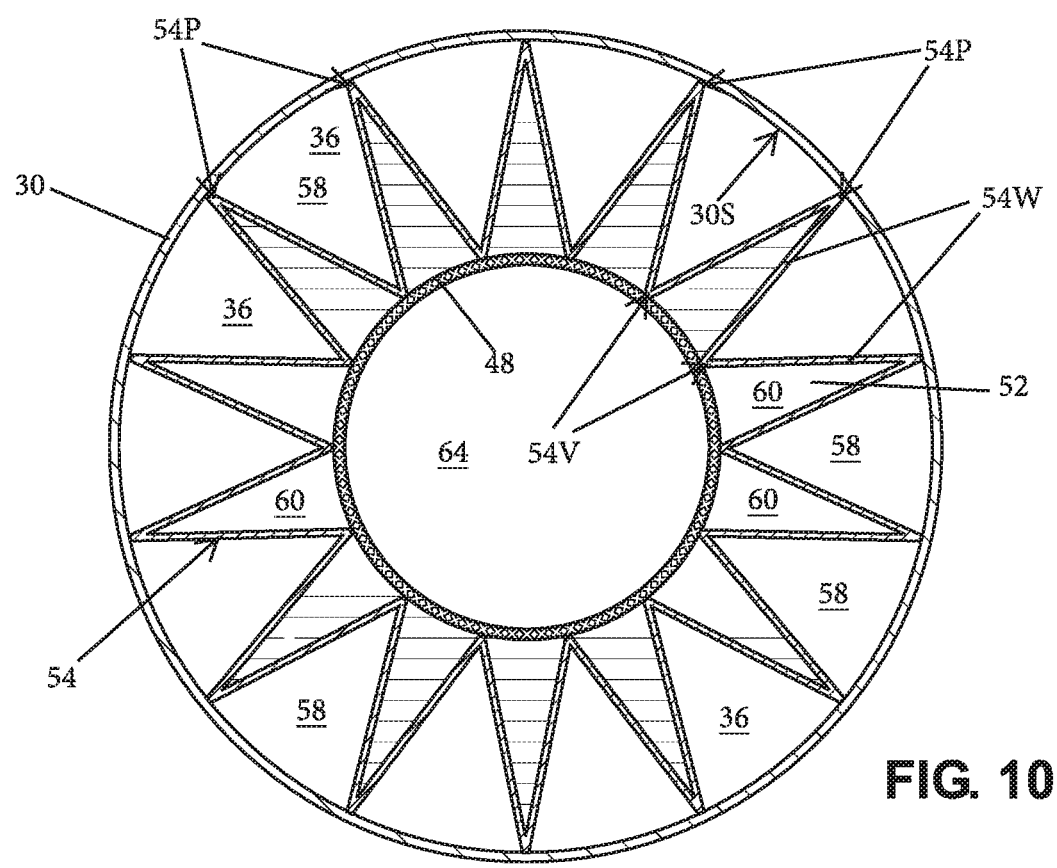
FIG. 10 is a cross section view of the air to air cross flow heat and moisture exchanger taken along line 10-10 of FIG. 6.
Figure 11:
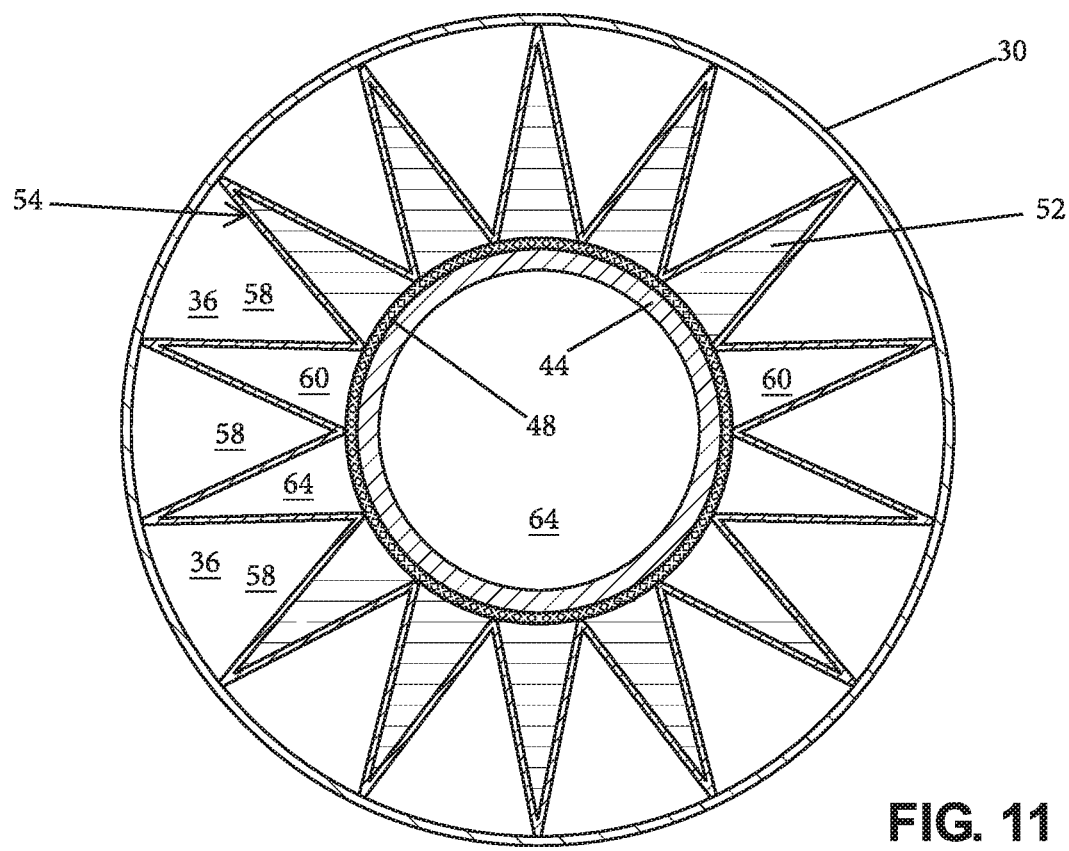
FIG. 11 is a cross section view of the air to air cross flow heat and moisture exchanger taken along line 11-11 of FIG. 6.
Figure 12:
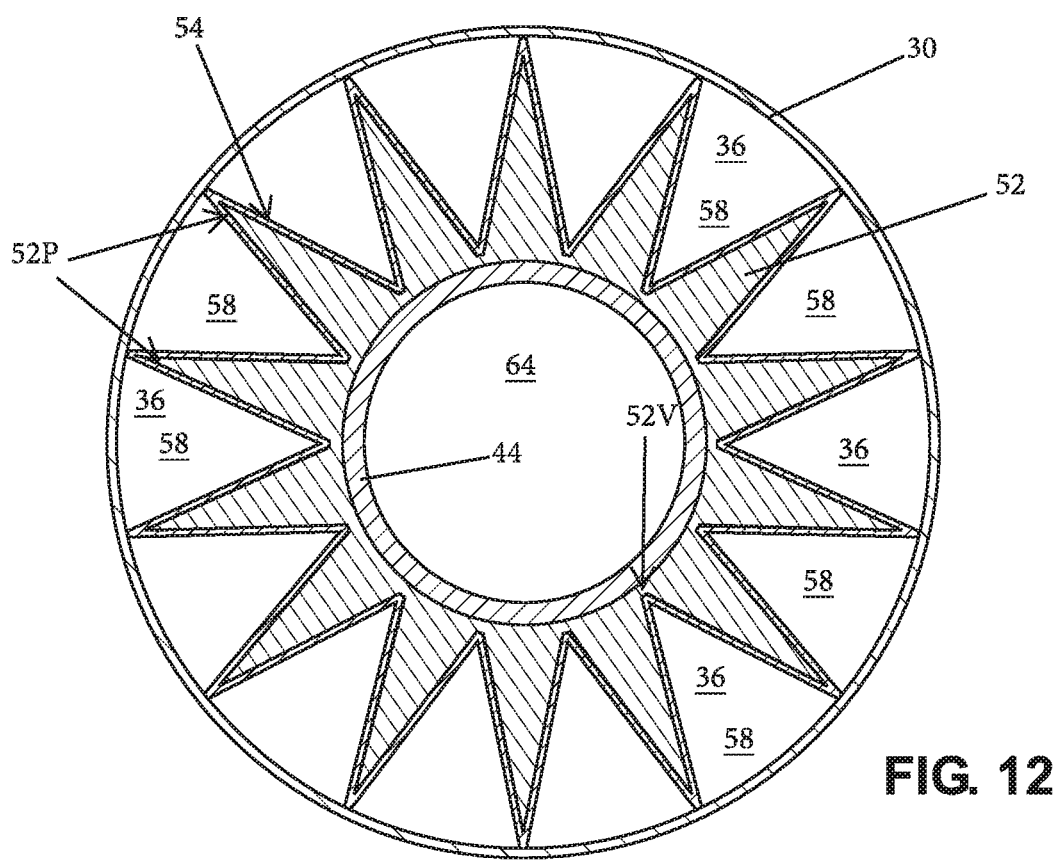
FIG. 12 is a cross section view of the air to air cross flow heat and moisture exchanger taken along line 12-12 of FIG. 6.
Figure 13:
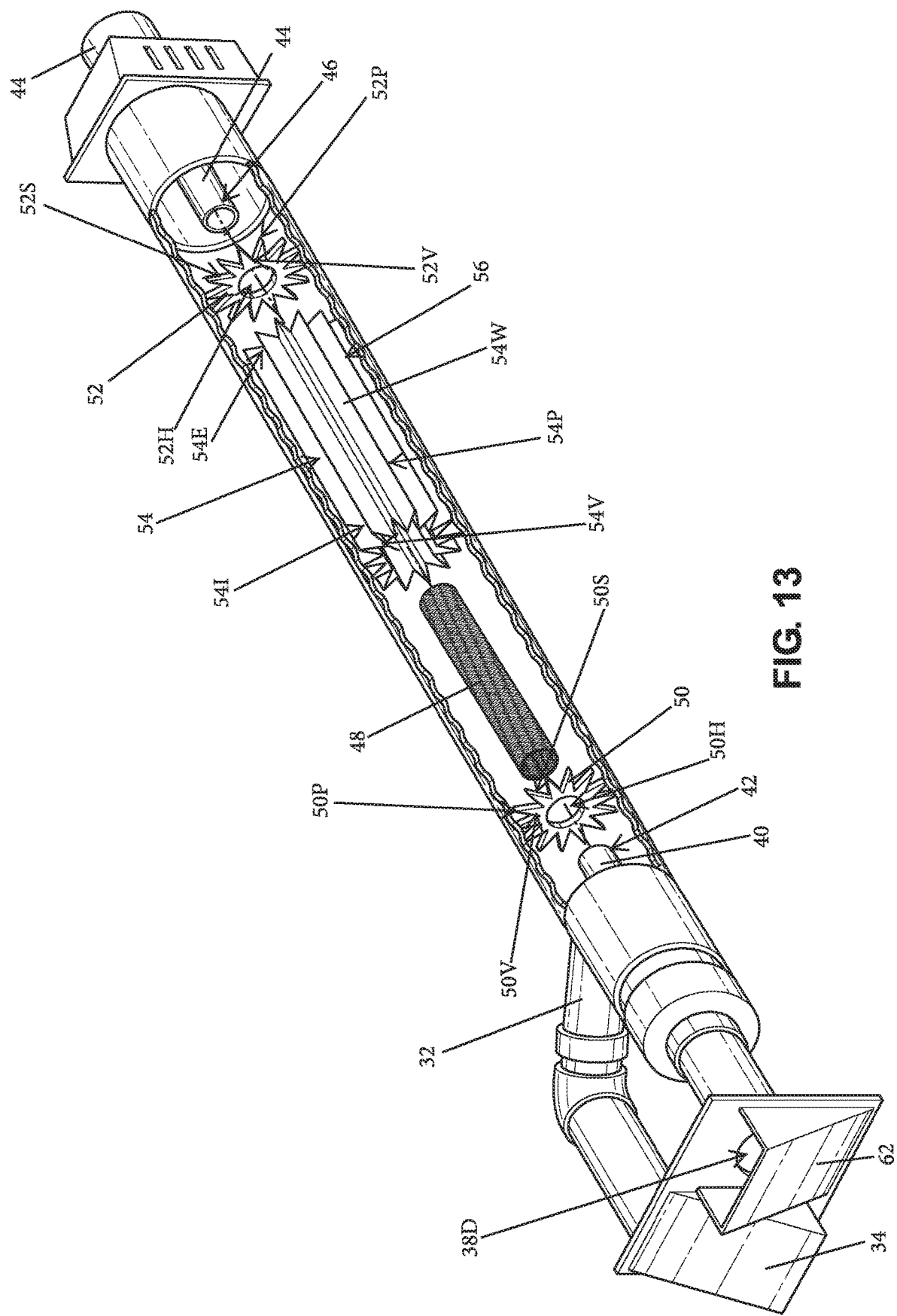
FIG. 13 is a perspective view similar to FIG. 4A but wherein the star-shaped air stop members, the cylindrical air permeable screen and the pleat shaped cylindrical sorption paper wall/assembly are shown exploded/unassembled.

As best seen in FIG. 10, the sorption paper longitudinally extending peaks 54P are disposed adjacent the interior surface 30S of the outer cylindrical housing/pipe 30 and the sorption paper longitudinally extending valleys 54V are disposed adjacent the cylindrical air permeable screen 48. Accordingly, the cylindrically shaped sorption paper wall/assembly 54 is radially supported and maintained in the position shown in FIG. 10 by the cylindrical air permeable screen 48.

As should now also be appreciated and best seen in FIG. 10, a plurality of generally triangular shaped (in cross section) exhaust cavities 58 are provided extending longitudinally between the housing 30 interior end 30I and exterior end 30E and bound by the housing interior surface 30S and adjacent sorption paper flat walls 55W. Also, a plurality of generally triangular shaped (in cross section) fresh air cavities 60 are provided extending longitudinally between the interior star-shaped air stop member 50 and the exterior star-shaped air stop member 52 and bound by the cylindrical air permeable screen 48 and adjacent sorption paper flat walls 55W. Of course, because screen 48 is air permeable, any air transported through the screen 48 will penetrate the screen and travel also through the fresh air cavities 60 as depicted by long-short line arrows 64 in FIGS. 6 and 14.

Figure 3:
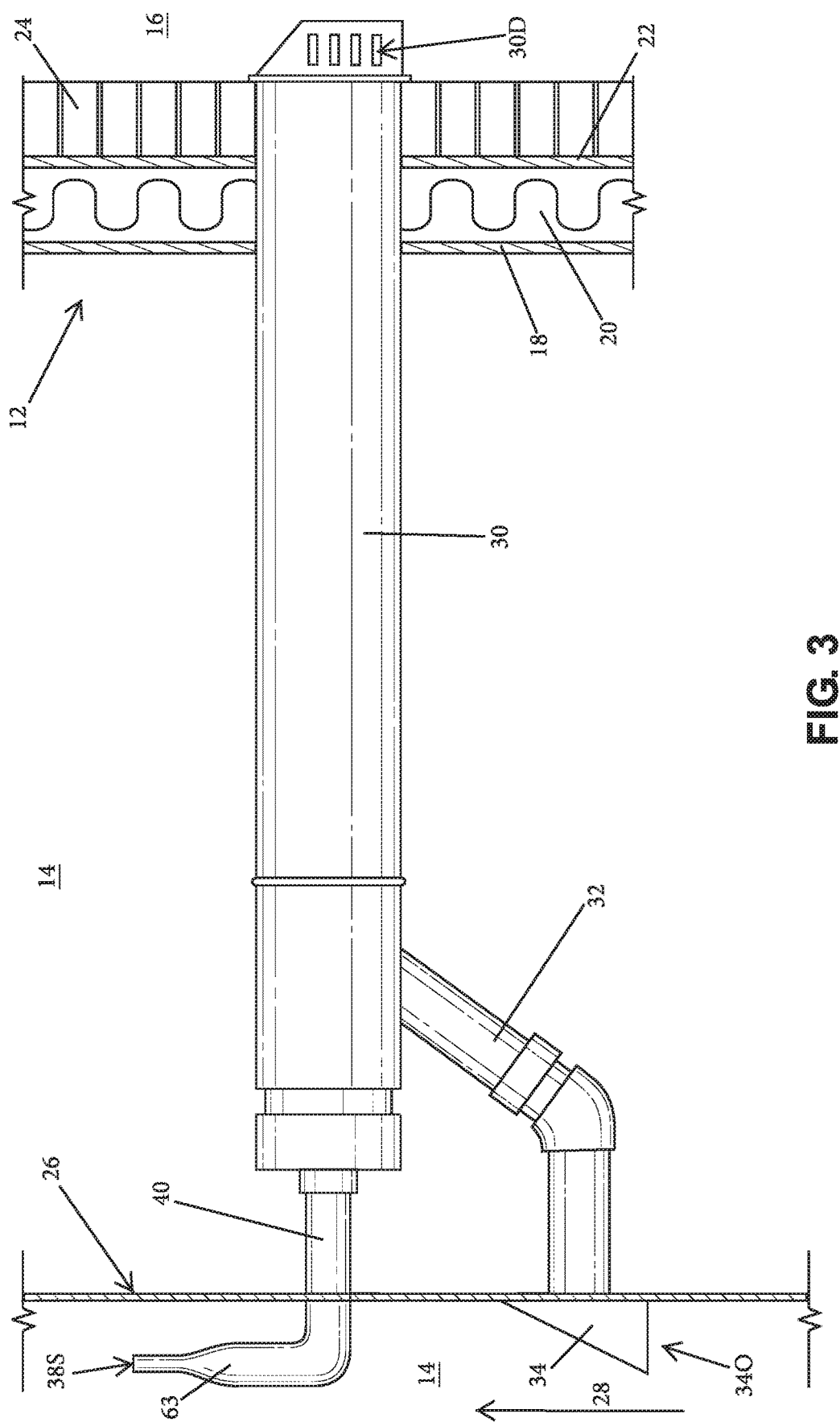
FIG. 3 is a side elevation view of the air to air cross flow heat and moisture exchanger shown in FIG. 1 and shown extending through a building wall and into a furnace duct, and further showing an alternate embodiment comprising a venturi shaped opening in the furnace duct.
Figure 4:
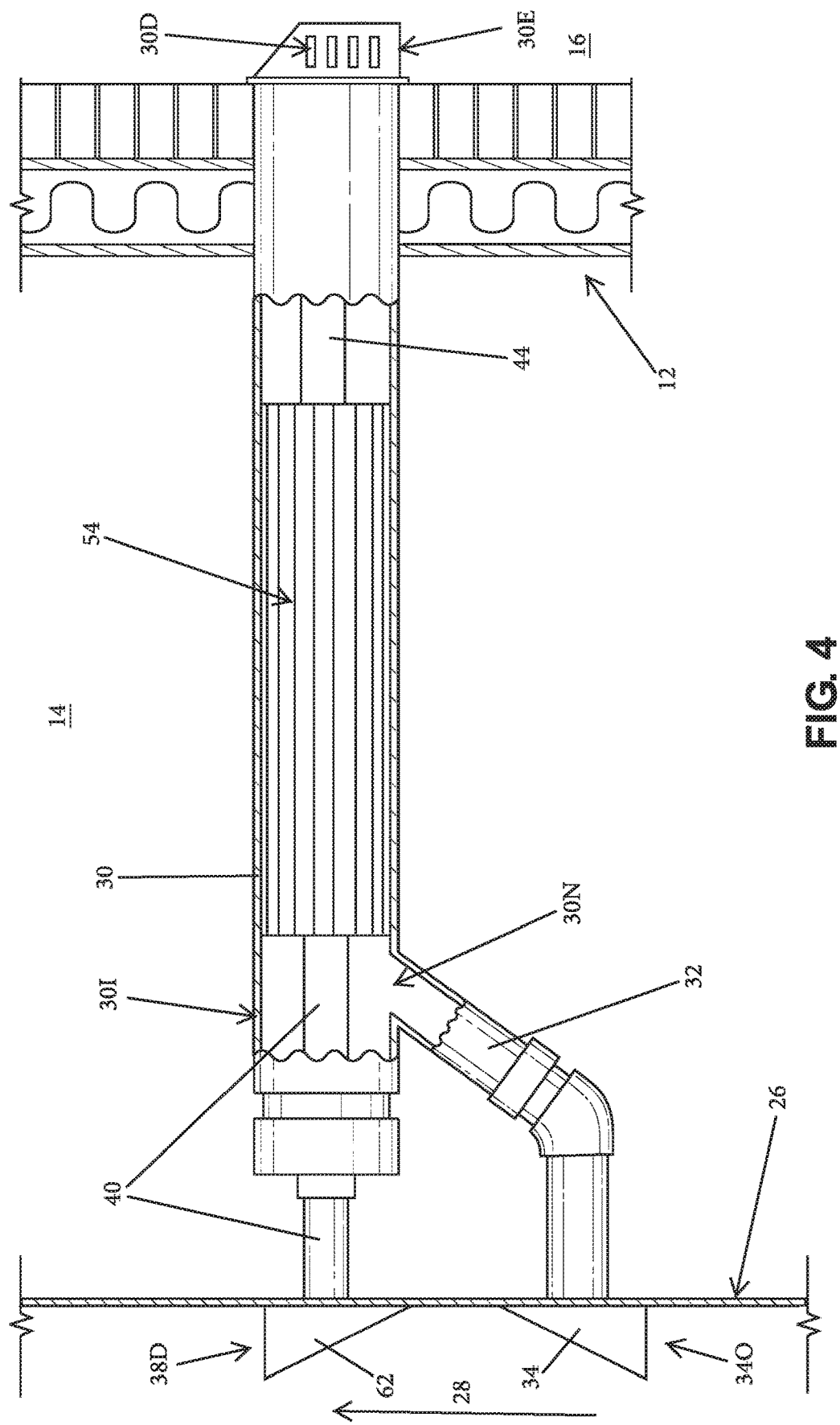
FIG. 4 is a side elevation view similar to FIG. 3 but wherein part of the exterior housing/pipe is removed and showing the pleat shaped cylindrical sorption paper wall/assembly therein.
Figure 4A:
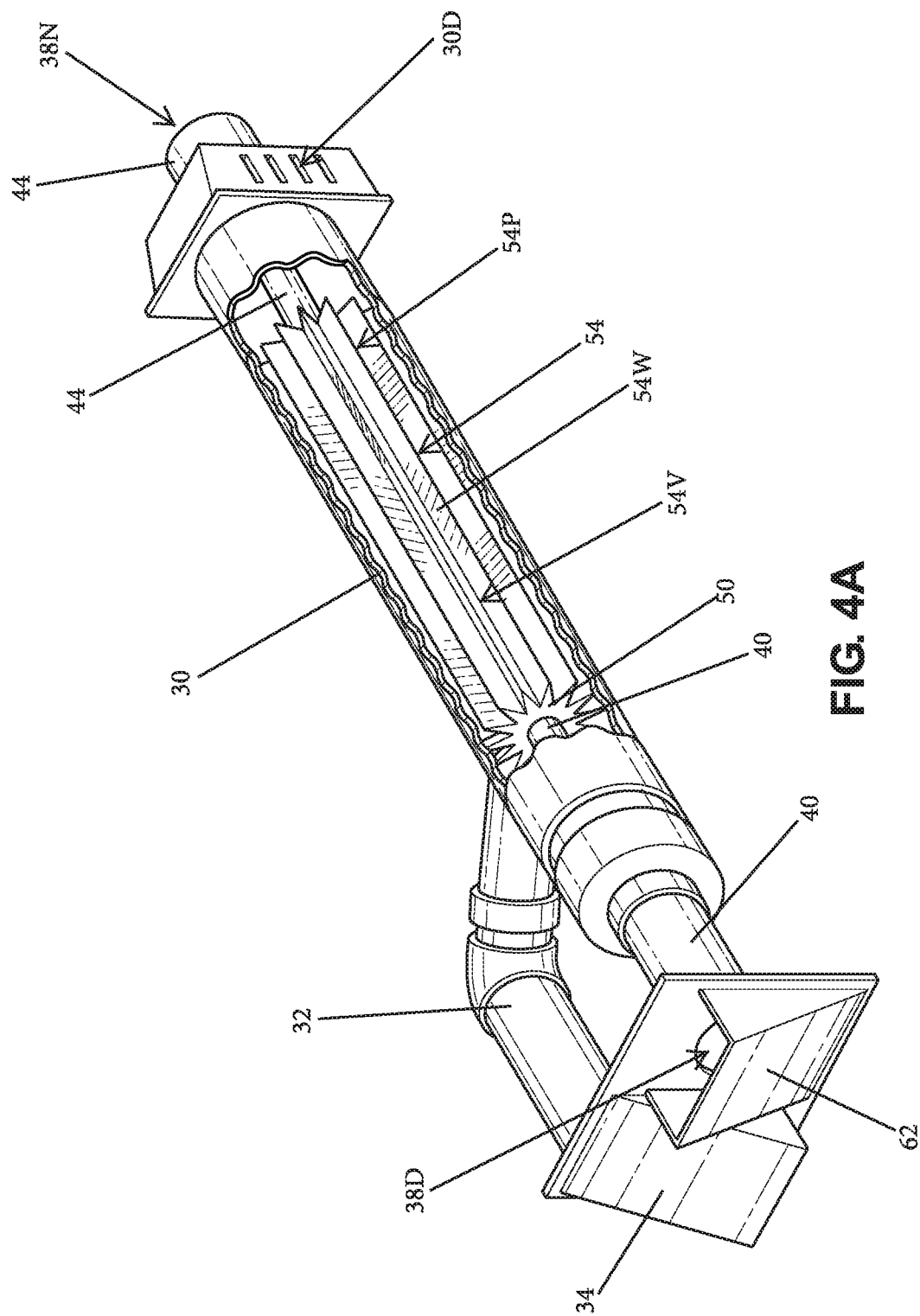
FIG. 4A is a perspective view similar to FIG. 1 but wherein part of the exterior housing/pipe is removed and thereby showing the pleat shaped cylindrical sorption paper wall/assembly therein.
Figure 5:
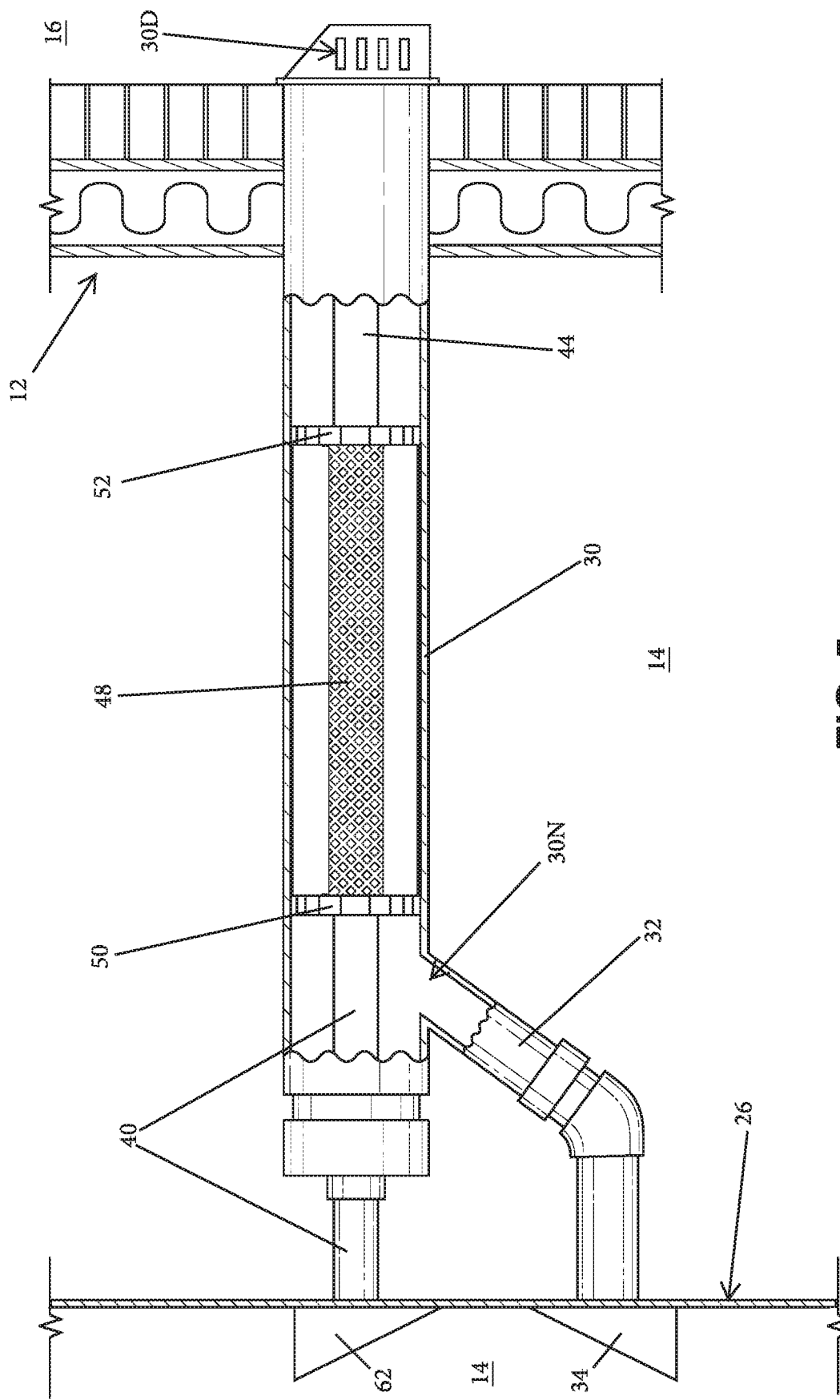
FIG. 5 is a side elevation view similar to FIG. 4 but wherein the pleat shaped cylindrical sorption paper wall/assembly has also been removed and thereby showing the star-shaped air stop members and the cylindrical air permeable screen therebetween.
Figure 5A:
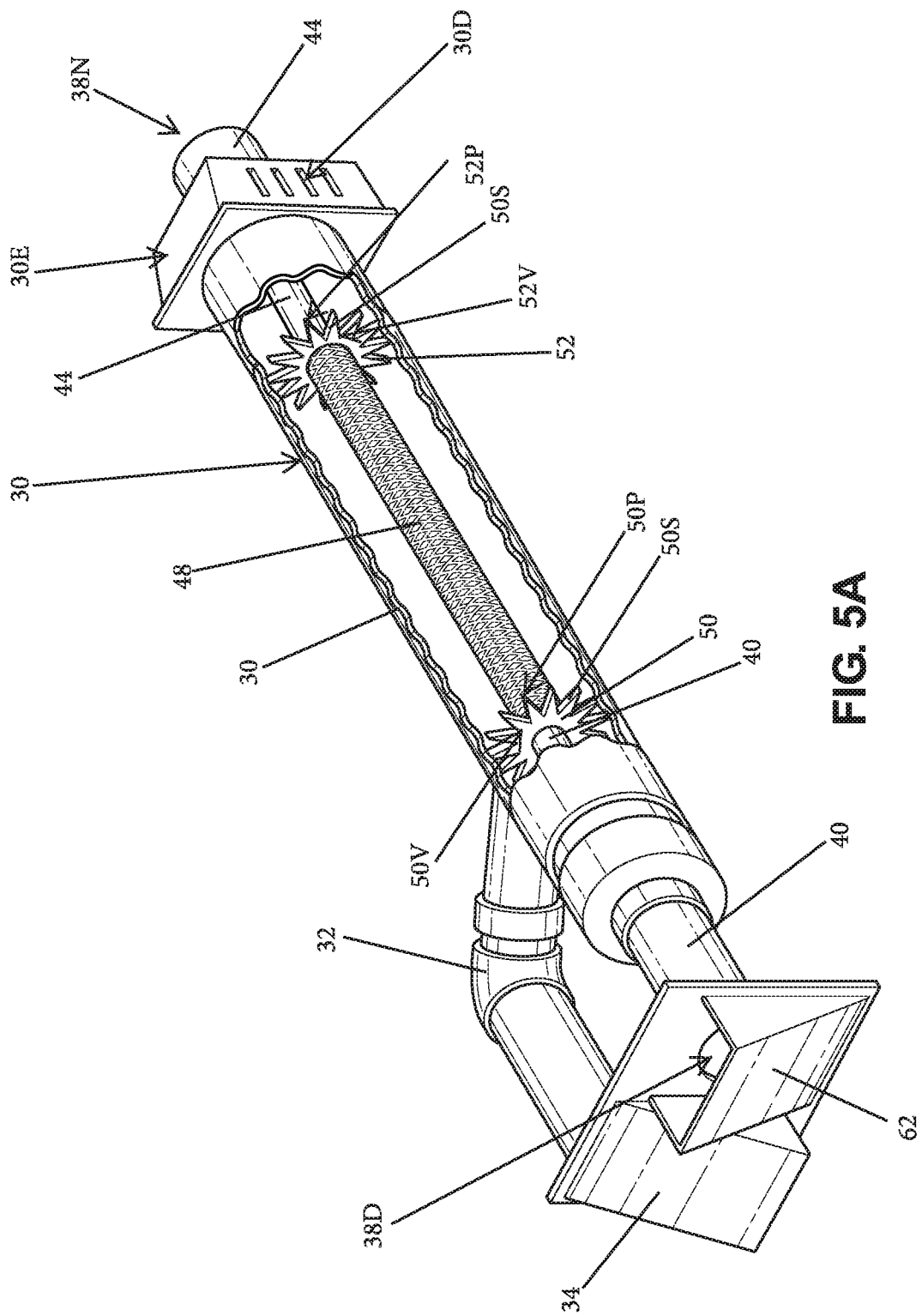
FIG. 5A is a perspective view similar to FIG. 4A but wherein the pleat shaped cylindrical sorption paper wall/assembly has also been removed and thereby showing the star-shaped air stop members and the cylindrical air permeable screen therebetween.
Figure 6:
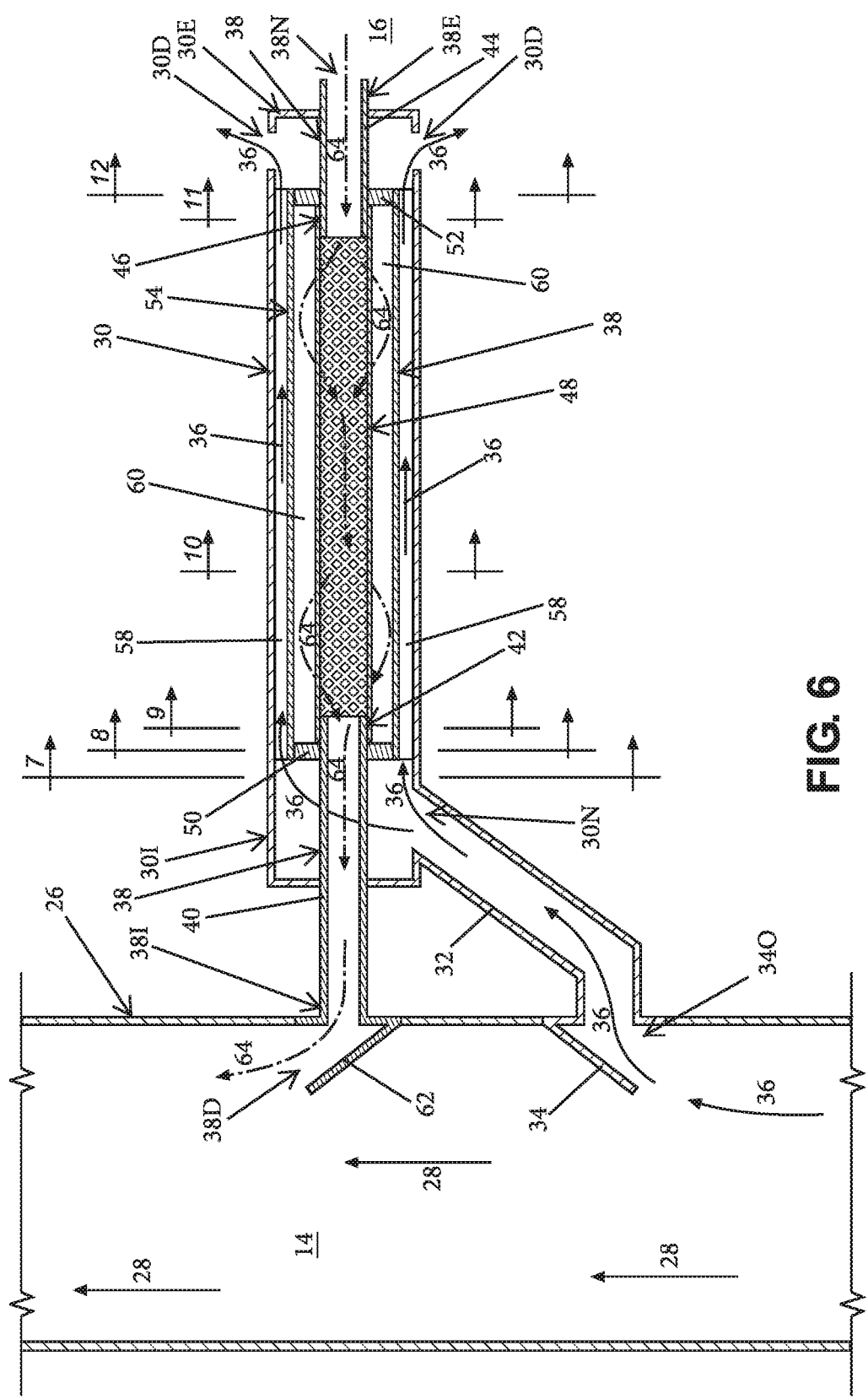
FIG. 6 is a diagrammatic cross section view of the air to air cross flow heat and moisture exchanger as shown in FIG. 1 and taken along line 6-6 of FIG. 7.
Figure 7:
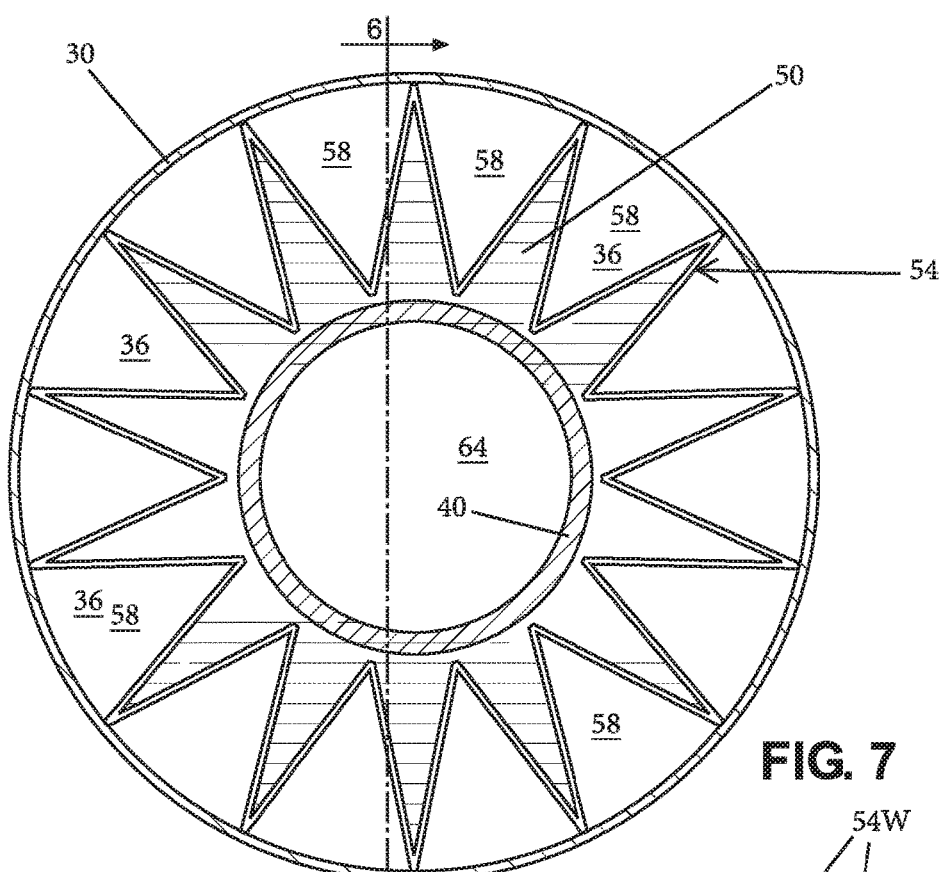
FIG. 7 is a cross section view of the air to air cross flow heat and moisture exchanger taken along line 7-7 of FIG. 6.
Figure 8:
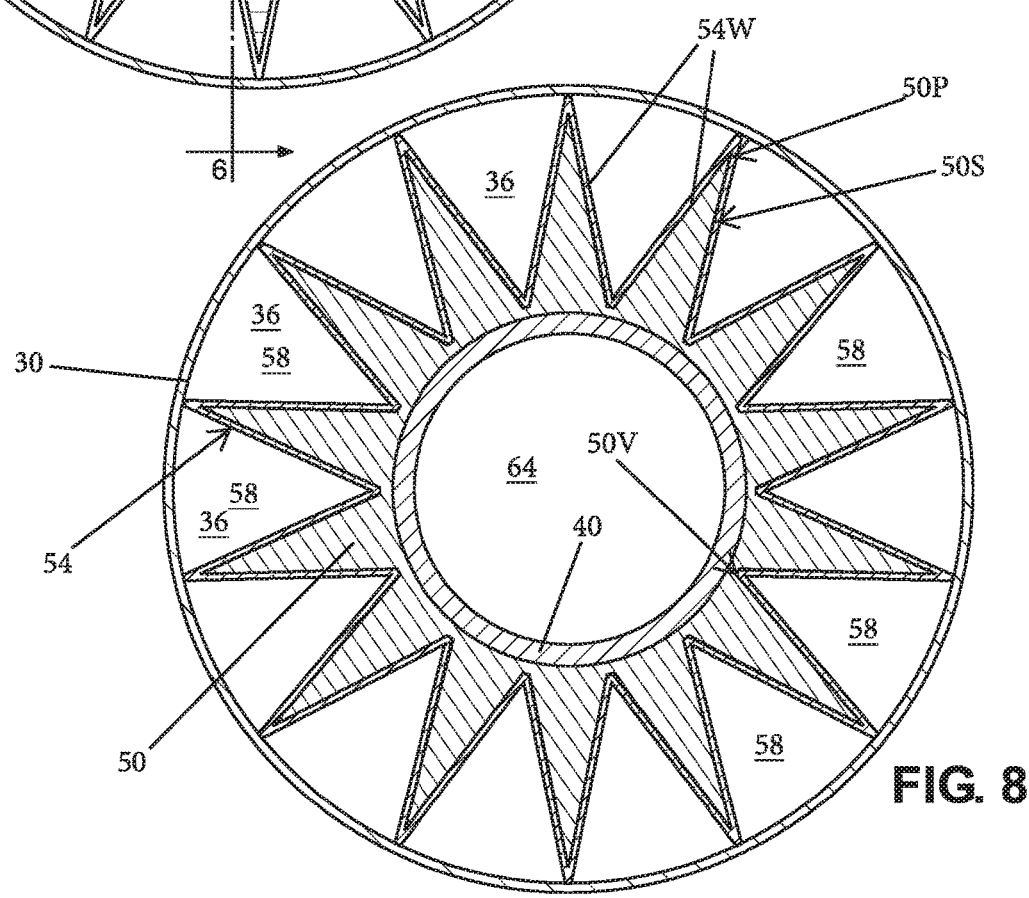
FIG. 8 is a cross section view of the air to air cross flow heat and moisture exchanger taken along line 8-8 of FIG. 6.
Figure 9:
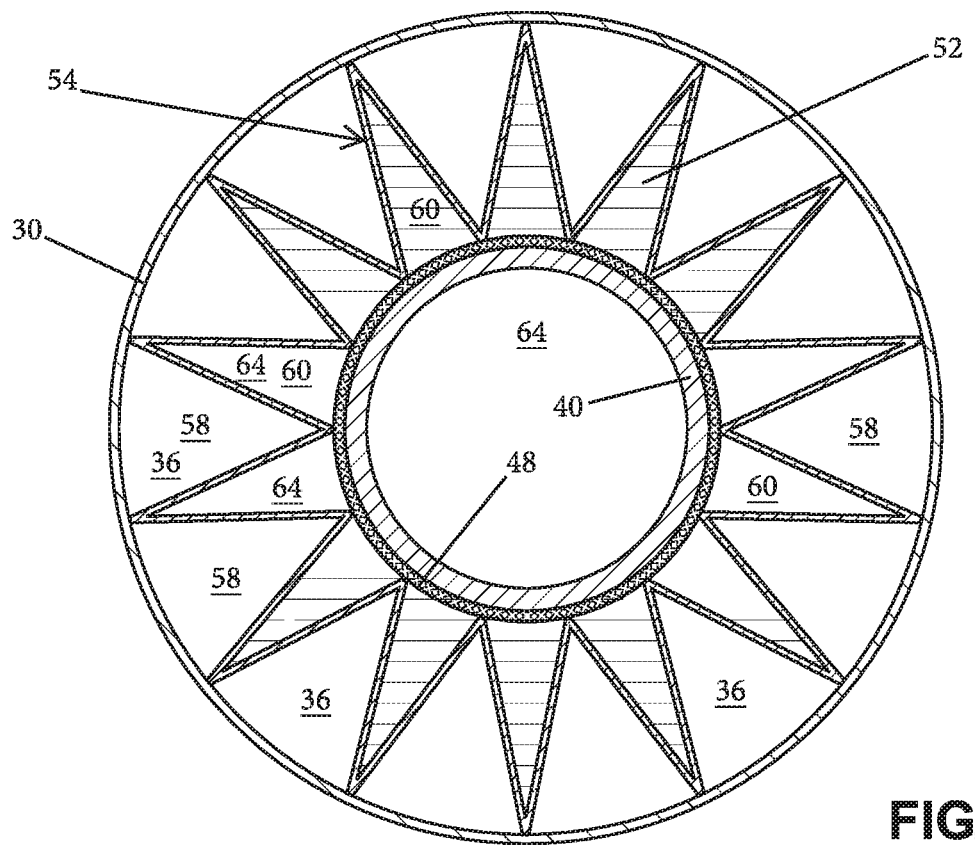
FIG. 9 is a cross section view of the air to air cross flow heat and moisture exchanger taken along line 9-9 of FIG. 6.
Figure 14:
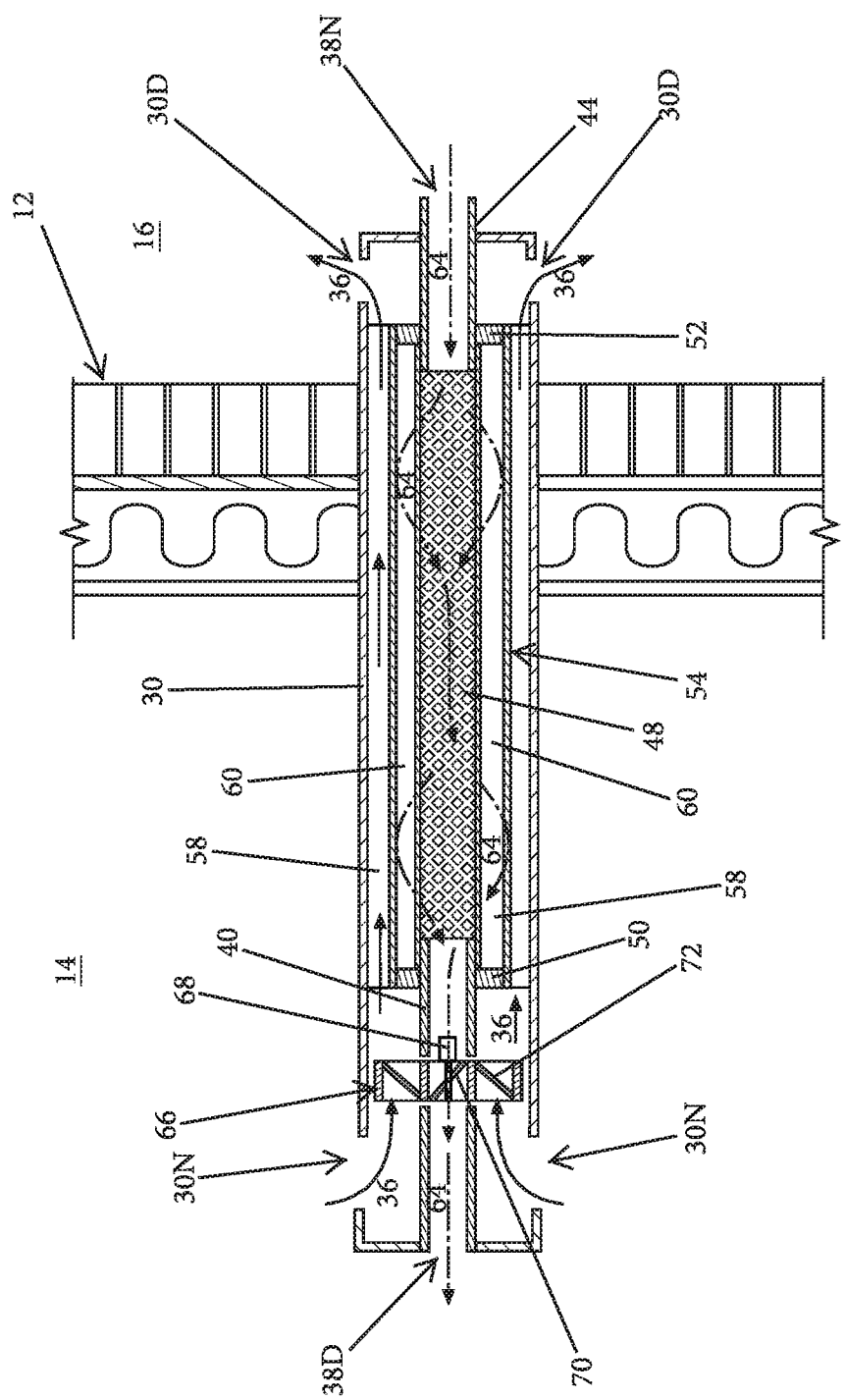
FIG. 14 is a diagrammatic cross section view similar to FIG. 6 but depicting another embodiment of the air to air cross flow heat and moisture exchanger constructed in accordance with the principles of the present invention and which includes a fan assembly; and, FIG. 15 is a perspective view of the fan assembly shown in FIG. 14.

As should now further be appreciated, the air to air cross flow heat and moisture exchanger 10 comprises an exhaust passageway between the outer elongate housing/pipe 30 and the inner elongate conduit 38 depicted in FIGS. 6 and 14 by solid line arrows 36 whereby air flowing through the duct 26 can be captured by the air exhaust scoop 34 and forced through the exhaust pipe 32, into the housing interior end 30I, through the triangular exhaust cavities 58, to the housing exterior end 30E and then out through the discharge openings 30D to the exterior space 16. Also, an interior space fresh air discharge scoop 62 can be provided at the terminal end 38I of the inner elongate conduit fresh air pipe 40 with its opening 38D facing in the same direction as the duct air flow 28 whereby a negative pressure can be created at the interior fresh air discharge opening 38D for drawing fresh air through a fresh air passageway, as depicted by the long-short line arrows 64 in FIGS. 6 and 14, extending from the exterior space 16 into the exterior fresh air intake opening 38N and through the exterior fresh air pipe 44, into the air permeable cylindrical screen 48 and traversing also through the triangular fresh air cavities 60, into the interior fresh air pipe 40 and finally through the fresh air discharge opening 38D and into the duct 26/to the inner space 14. As shown in FIG. 3, instead of a the discharge scoop 32, a venturi tube 63 can preferably be used at the terminal end of the pipe 40 having a smaller opening 30S whereby negative pressure can be created thereat for drawing fresh air through the fresh air passageway as depicted by the long-short line arrows 64.

The cylindrically shaped sorption paper wall/assembly 54 is preferably made/constructed of sorption paper such as that shown and described in US 2009/0126898A1 and in CN1442576A, the disclosures of which are incorporated herein by reference. This and other similarly available sorption paper is capable of and functions to conduct and/or convey both heat and water moisture therethrough. Accordingly, as air is exhausted through the exhaust passageway 36 and travels through the triangular exhaust cavities 58 adjacent the interior surfaces of the sorption flat walls 54W, and fresh air is drawn in the opposite direction through the fresh air passageway 64 and travels through the triangular fresh air cavities 60 adjacent the exterior surfaces of the sorption flat walls 54W, both heat and water moisture is advantageously exchanged through the sorption paper flat walls 54W from the fresh air to the exhausted air and vice versa. Also, because the sorption paper wall/assembly 54 is pleat shaped, a substantially large sorption paper surface area is provided in a relatively small volume within the exchanger housing 30 thereby efficiently and effectively conveying heat and water moisture between the fresh air and the exhausted air.

Figure 15:
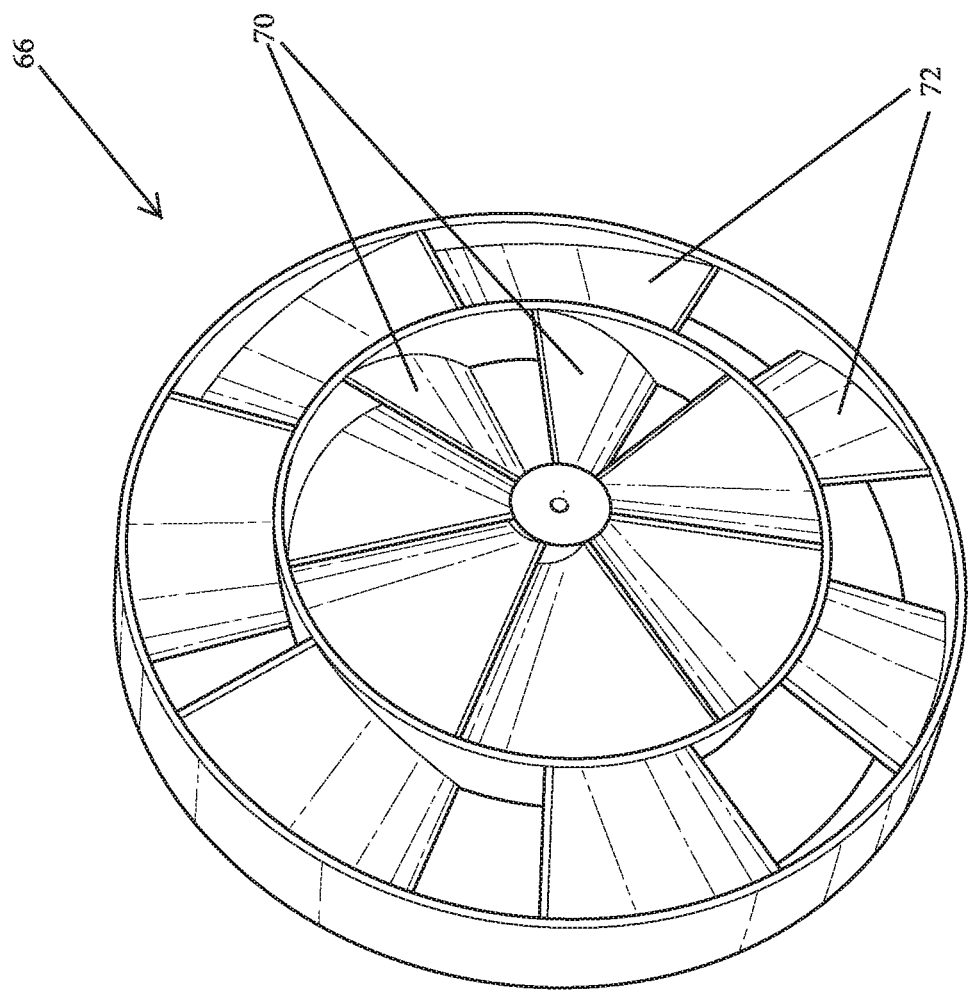

Referring now more particularly to FIGS. 14 and 15, the exchanger 10 can include a fan assembly generally designated by the numeral 66 and driven by an electric motor 68. Fan assembly 66 includes central blades 70 aligned with the fresh air passageway 64 and which are adapted to push fresh air therethrough in the direction indicated by the long-short line arrows 64. Fan assembly 66 further includes circumscribing blades 72 disposed radially around the central blades 70 and aligned with the exhaust air passageway 36 adapted to push exhaust air therethrough in the direction indicated by the solid arrows 36. Accordingly, although the fan assembly 66 is rotatably driven by a single motor 68 and the same rotational direction, the fresh air within passageway 64 and the exhaust air within passageway 36 are pushed in opposite directions as needed for the cross flow exchanger 10.

While this invention has been described as having an exemplary design, the present invention may be further modified within the spirit and scope of this disclosure. This application is therefore intended to cover any variations, uses, or adaptations of the invention using its general principles.

What is claimed is:

1. An air to air cross flow heat and water moisture exchanger for transporting air through a wall between interior and exterior spaces, the exchanger comprising:
    an outer elongate housing;
    an inner elongate conduit disposed longitudinally within the outer elongate housing;
    the inner elongate conduit defining a first passageway therethrough extending between the interior and exterior spaces;
    the outer elongate housing and the inner elongate conduit together defining a second passageway therebetween extending between the interior and exterior spaces; and,
    a portion of the inner elongate conduit comprising a sorption paper wall between the first and second passageways, wherein the sorption paper wall conducts heat and water moisture therethrough and is generally impervious to air, whereby heat and water moisture is exchanged through the sorption paper wall between the air traveling through the first passageway and the air traveling through the second passageway.

2. The air to air cross flow heat and water moisture exchanger of claim 1 wherein the sorption paper wall is pleat shaped.

3. The air to air cross flow heat and water moisture exchanger of claim 2 further comprising an air permeable screen supporting the pleat shaped sorption paper wall.

4. The air to air cross flow heat and water moisture exchanger of claim 3 wherein the pleat shaped sorption paper wall extends between peaks and valleys and wherein the valleys are disposed adjacent the air permeable screen and the peaks are disposed adjacent the outer elongate housing.

5. The air to air cross flow heat and water moisture exchanger of claim 4 wherein:
    the interior space comprises an air duct with directional air flow therethrough;
    an exhaust air scoop extending into the air duct having an opening facing opposite the direction of the duct air flow and communicating with one of the first or second passageways; and,
    an intake air scoop extending into the air duct having an opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop to the air duct interior space.

6. The air to air cross flow heat and water moisture exchanger of claim 4 further comprising:
    a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction;
    wherein the central blades are aligned with the first passageway extending through the inner pipe; and,
    wherein the circumscribing blades are aligned with the second passageway between the outer elongate housing pipe and the inner elongate pipe.

7. The air to air cross flow heat and water moisture exchanger of claim 1 wherein:
    the interior space comprises an air duct with directional air flow therethrough;

an exhaust air scoop extending into the air duct having an opening facing opposite the direction of the duct air flow and communicating with one of the first or second passageways; and, an intake air scoop extending into the air duct having an opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop to the air duct interior space.

8. The air to air cross flow heat and water moisture exchanger of claim 1 further comprising:

a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction;

wherein the central blades are aligned with the first passageway extending through the inner pipe; and, wherein the circumscribing blades are aligned with the second passageway between the outer elongate housing pipe and the inner elongate pipe.

9. The air to air cross flow heat and water moisture exchanger of claim 1 further comprising an air permeable screen supporting the sorption paper wall.

10. The air to air cross flow heat and water moisture exchanger of claim 1 wherein:

the interior space comprises an air duct with directional air flow therethrough;

an exhaust air scoop extending into the air duct having an opening facing opposite the direction of the duct air flow and communicating with one of the first or second passageways; and, a venturi shaped tube extending into the air duct having a venturi opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the venturi opening to the air duct interior space.

11. An air to air cross flow heat and water moisture exchanger for transporting air through a wall between interior and exterior spaces, the exchanger comprising:

an outer elongate housing;

an inner elongate conduit disposed longitudinally within the outer elongate housing;

the inner elongate conduit defining a first passageway therethrough extending between the interior and exterior spaces;

the outer elongate housing and the inner elongate conduit together defining a second passageway therebetween extending between the interior and exterior spaces; and, a portion of the inner elongate conduit between interior and exterior ends thereof comprising a cylindrical sorption paper wall between the first and second passageways, wherein the sorption paper wall conducts heat and water moisture therethrough and is generally impervious to air, whereby heat and water moisture is exchanged through the sorption paper wall between the air traveling through the first passageway and the air traveling through the second passageway.

12. The air to air cross flow heat and water moisture exchanger of claim 11 further comprising a cylindrical air permeable screen secured to and extending between the inner elongate conduit interior and exterior ends and supporting the cylindrical sorption paper wall.

13. The air to air cross flow heat and water moisture exchanger of claim 12 wherein the cylindrical sorption paper wall is pleat shaped and wherein the pleats extend longitudinally along the cylindrical air permeable screen.

14. The air to air cross flow heat and water moisture exchanger of claim 13 wherein the pleat shaped sorption paper wall extends between longitudinally extending peaks and valleys and wherein the valleys are disposed adjacent the cylindrical air permeable screen and the peaks are disposed adjacent the outer elongate housing.

15. The air to air cross flow heat and water moisture exchanger of claim 14 further comprising star shaped air stop members at each of the inner elongate conduit interior and exterior ends, wherein the star shaped air stop members extend between an exterior surface of the inner elongate conduit and the longitudinal ends of the pleat shaped sorption paper, whereby the longitudinal ends of the pleat shaped sorption paper are hermetically sealed for preventing air flow threat between the first and second passageways.

16. The air to air cross flow heat and water moisture exchanger of claim 15 wherein:

the interior space comprises an air duct with directional air flow therethrough;

an exhaust air scoop extending into the air duct having an opening facing opposite the direction of the duct air flow and communicating with one of the first or second passageways; and, an intake air scoop extending into the air duct having an opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop to the air duct interior space.

17. The air to air cross flow heat and water moisture exchanger of claim 15 further comprising:

a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction;

wherein the central blades are aligned with the first passageway extending through the inner pipe; and, wherein the circumscribing blades are aligned with the second passageway between the outer elongate housing pipe and the inner elongate pipe.

18. The air to air cross flow heat and water moisture exchanger of claim 11 wherein the cylindrical sorption paper wall is pleat shaped and wherein the pleats extend longitudinally along the outer elongate housing pipe.

19. The air to air cross flow heat and water moisture exchanger of claim 18 wherein the pleat shaped sorption paper wall extends between longitudinally extending peaks and valleys.

20. The air to air cross flow heat and water moisture exchanger of claim 19 further comprising star shaped air stop members at each of the inner elongate pipe interior and exterior ends, wherein the star shaped air stop members extend between an exterior surface of the inner elongate pipe and the longitudinal ends of the pleat shaped sorption paper, whereby the longitudinal ends of the pleat shaped sorption paper are hermetically sealed for preventing air flow thereat between the first and second passageways.

21. The air to air cross flow heat and water moisture exchanger of claim 20 wherein:
   the interior space comprises an air duct with directional air flow therethrough;
   an exhaust air scoop extending into the air duct having an opening facing the direction of the duct air flow and communicating with one of the first or second passageways; and,
   an intake air scoop extending into the air duct having an opening facing opposite the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the intake scoop to the air duct interior space.

22. The air to air cross flow heat and water moisture exchanger of claim 20 further comprising:
   a rotatably driven fan comprising central blades adapted to direct air flow therethrough in a first longitudinal direction and circumscribing blades surrounding the central blades and adapted to direct air flow therethrough in a second longitudinal direction opposite the first longitudinal direction;
   wherein the central blades are aligned with the first passageway extending through the inner pipe; and,
   wherein the circumscribing blades are aligned with the second passageway between the outer elongate housing pipe and the inner elongate pipe.

23. The air to air cross flow heat and water moisture exchanger of claim 11 wherein:
   the interior space comprises an air duct with directional air flow therethrough;
   an exhaust air scoop extending into the air duct having an opening facing opposite the direction of the duct air flow and communicating with one of the first or second passageways; and,
   a venturi shaped tube extending into the air duct having a venturi opening facing the direction of the duct air flow and communicating with the other one of the first or second passageways, whereby air within the air duct is forced into the exhaust air scoop, through one of the first or second passageways to the exterior space, and air from the exterior space is forced through the other one of the first or second passageways and out of the venturi opening to the air duct interior space.

* * * * *

UNITED STATES PATENT AND TRADEMARK OFFICE
CERTIFICATE OF CORRECTION

PATENT NO. : 11,391,487 B2
APPLICATION NO. : 17/023500
DATED : July 19, 2022
INVENTOR(S) : Bradford D. Wallace It is certified that error appears in the above-identified patent and that said Letters Patent is hereby corrected as shown below:

In the Specification

Column 5, Line 8, delete "301" and insert --30I--

Column 5, Line 15, delete "340" and insert --34O--

Column 5, Line 26, delete "381" and insert --38I--

Column 5, Line 31, delete "301" and insert --30I--

Column 5, Line 32, delete "381" and insert --38I--

Column 6, Line 19, delete "541" and insert --54I--

Column 6, Line 47, delete "301" and insert --30I--

Column 6, Line 67, delete "301" and insert --30I--

Column 7, Line 4, delete "381" and insert --38I--

Signed and Sealed this
Twenty-third Day of August, 2022

Katherine Kelly Vidal
*Director of the United States Patent and Trademark Office*